United States Patent
Suzuki et al.

(10) Patent No.: US 8,885,102 B1
(45) Date of Patent: Nov. 11, 2014

(54) VIDEO TRANSMISSION DEVICE, VIDEO DISPLAY DEVICE, AND VIDEO TRANSMISSION METHOD

(71) Applicant: Kabushiki Kaisha Toshiba, Tokyo (JP)

(72) Inventors: Nobuaki Suzuki, Akishima (JP); Masahiko Mawatari, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/257,892

(22) Filed: Apr. 21, 2014

Related U.S. Application Data

(63) Continuation of application No. PCT/JP2013/066512, filed on Jun. 14, 2013.

(51) Int. Cl.
  *H04N 11/06* (2006.01)
  *H04N 5/44* (2011.01)
  *H04N 11/08* (2006.01)

(52) U.S. Cl.
  CPC . *H04N 11/08* (2013.01); *H04N 5/44* (2013.01)
  USPC .......................................... 348/488; 348/491

(58) Field of Classification Search
  USPC ........... 348/469, 488, 489, 493, 388.1, 391.1, 348/392.1, 491, 492
  See application file for complete search history.

(56) References Cited

U.S. PATENT DOCUMENTS

| | | | |
|---|---|---|---|
| 5,982,432 A * | 11/1999 | Uenoyama et al. | 375/240.01 |
| 6,262,771 B1 * | 7/2001 | Higurashi et al. | 348/441 |
| 6,295,406 B1 * | 9/2001 | Matsumi et al. | 386/306 |
| 6,914,637 B1 | 7/2005 | Wolf et al. | |
| 7,088,398 B1 | 8/2006 | Wolf et al. | |
| 7,257,163 B2 | 8/2007 | Hwang et al. | |
| 7,283,566 B2 | 10/2007 | Siemens et al. | |
| 7,359,437 B2 | 4/2008 | Hwang et al. | |
| 7,558,326 B1 | 7/2009 | Lyle et al. | |
| 2010/0073574 A1 | 3/2010 | Nakajima et al. | |
| 2011/0141238 A1 | 6/2011 | Tsukagoshi | |
| 2013/0208183 A1 | 8/2013 | Suzuki et al. | |

FOREIGN PATENT DOCUMENTS

| | | |
|---|---|---|
| EP | 2495963 | 9/2012 |
| JP | 10-262265 | 9/1998 |
| JP | 2005-514873 | 5/2005 |

(Continued)

OTHER PUBLICATIONS

International Search Report for PCT Application No. PCT/JP2013/066512 filed on Jun. 14, 2013.

*Primary Examiner* — Michael Lee
(74) *Attorney, Agent, or Firm* — Knobbe Martens Olson & Bear LLP

(57) ABSTRACT

A device includes a transmitter that transmits, via an interface comprising first, second, and third transmission channels, video data having a 4:1:1 format to a display device. 4:1:1 represents a ratio of a sampling frequencies of a brightness component, to a first color difference component, to a second color difference component. The first and second color difference components of one pixel in a first horizontal line of a first frame of the video data are allocated and transmitted within two clock cycles of the first transmission channel. Brightness components of four pixels in the first horizontal line are allocated and transmitted within two clock cycles of the second and third transmission channels. The transmitter transmits the video data for all of the pixels of the first horizontal line, and thereafter, sets pixels in a second horizontal line as a target to be transmitted.

6 Claims, 11 Drawing Sheets

(56) References Cited

FOREIGN PATENT DOCUMENTS

| | | |
|---|---|---|
| JP | 2009-213110 | 9/2009 |
| JP | 2011-166757 | 8/2011 |
| JP | 12345674 | 9/2012 |
| JP | 2012-253429 | 12/2012 |
| JP | 2013-102415 | 5/2013 |
| JP | 2013-115456 | 6/2013 |
| WO | WO 03/058946 | 7/2003 |

* cited by examiner

FIG.8

| BYTE # | 7 | 6 | 5 | 4 | 3 | 2 | 1 | 0 |
|---|---|---|---|---|---|---|---|---|
| 0 | VENDOR-SPECIFIC TAG CODE(=3) | | | LENGTH (=N) | | | | |
| 1 | 24-bit IEEE REGISTRATION IDENTIFIER (0xXXXX) (LEAST SIGNIFICANT BYTE FIRST) | | | | | | | |
| 2 | | | | | | | | |
| 3 | | | | | | | | |
| 4 | YCbCr (4:1:1) INDICATOR | Rsvd (0) | Rsvd (0) | Rsvd (0) | Rsvd (0) | Rsvd (0) | Rsvd (0) | Rsvd (0) |
| 5 | VIC_1 | | | | | | | |
| 6 | VIC_2 | | | | | | | |
| 7 | VIC_3 | | | | | | | |
| 8 | VIC_4 | | | | | | | |
| 9 | VIC_5 | | | | | | | |
| 10 | VIC_6 | | | | | | | |
| N | RESERVED | | | | | | | |

| PACKET BYTE # | 7 | 6 | 5 | 4 | 3 | 2 | 1 | 0 |
|---|---|---|---|---|---|---|---|---|
| PB0 | CHECKSUM | | | | | | | |
| PB1 | 24-BIT IEEE REGISTRATION IDENTIFIER (0xXXXX)<br>(LEAST SIGNIFICANT BYTE FIRST) | | | | | | | |
| PB2 | | | | | | | | |
| PB3 | | | | | | | | |
| PB4 | YCbCr (4:1:1) INDICATOR | (4:1:1) FORMAT | Rsvd (0) | Rsvd (0) | Rsvd (0) | Rsvd (0) | Rsvd (0) | Rsvd (0) |
| PB5 | VIC | | | | | | | |

1001

VIDEO TRANSMISSION DEVICE, VIDEO DISPLAY DEVICE, AND VIDEO TRANSMISSION METHOD

CROSS-REFERENCE TO RELATED APPLICATIONS

This application is a continuation of PCT international application Ser. No. PCT/JP2013/066512, filed Jun. 14, 2013, which designates the United States, incorporated herein by reference.

FIELD

Embodiments described herein relate generally to a video transmission device, a video display device, and a video transmission method.

BACKGROUND

Conventionally, as an example of a communication interface between a video transmission device such as a DVD player or a set top box, and a video display device such as a television receiver or a television monitor, there has been proposed the high definition multimedia interface (HDMI) (registered trademark) specification.

Recently, there has been increasing demand for a high resolution video having a 4k2k (3840×2160) resolution due to the increase in a display size of the television receiver, the television monitor, or the like.

In a conventional technique, there has been a drawback that, when a high resolution video image having the 4k2k resolution or the like is transferred through a communication interface such as the HDMI (registered trademark) or the like, it is difficult to increase a refresh rate without increasing a transfer quantity in the communication interface because of the large amount of data per one frame.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 8 is a view illustrating an example of a data structure of an EDID in the first embodiment;

FIG. 10 is a view illustrating an example of a data structure of an InfoFrame packet in the first embodiment;

DETAILED DESCRIPTION

In general, according to one embodiment, a video transmission device comprises a transmitter. The transmitter is configured to transmit, via a communication interface comprising a first transmission channel, a second transmission channel, and a third transmission channel, video data having a 4:1:1 format to a video display device configured to display the video data. 4:1:1 represents a ratio of a sampling frequency of a brightness component, to a sampling frequency of a first color difference component, to a sampling frequency of a second color difference component. The first color difference component and the second color difference component of one pixel in a first horizontal line of a first frame of the video data are allocated and transmitted within two clock cycles of the first transmission channel. Brightness components of four pixels in the first horizontal line are allocated and transmitted within two clock cycles of the second transmission channel and the third transmission channel. The transmitter is configured to transmit the video data to the video display device for all of the pixels of the first horizontal line of the first frame of the video data. After transmitting the video data for all of the pixels of the first horizontal line, the transmitter is configured to set pixels in a second horizontal line next to the first horizontal line of the first frame of the video data as a target to be transmitted.

Figure 1:
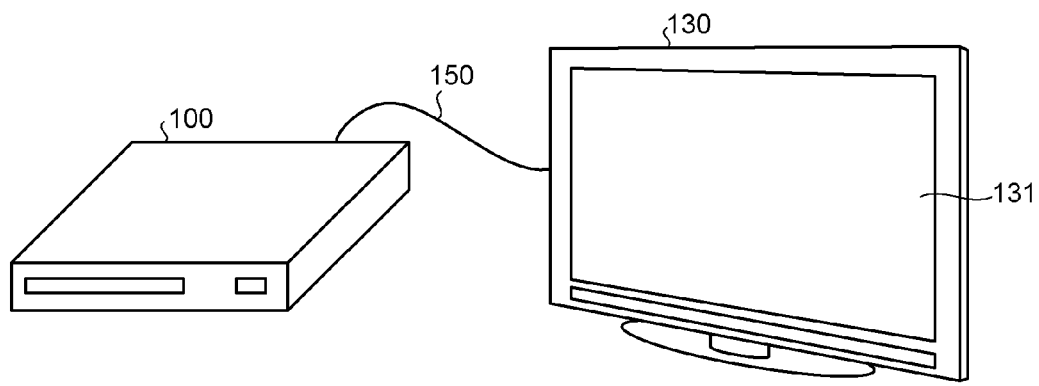
FIG. 1 is a view illustrating one example of a transmission system of video data according to a first embodiment.

FIG. 1 is a view illustrating one example of a transmission system of video data according to a first embodiment. In the transmission system illustrated in FIG. 1, a video reproducing device 100 and a video display device 130 are connected with each other via a high definition multimedia interface (HDMI (registered trademark)) cable 150 as an example.

Furthermore, the video reproducing device 100 illustrated in FIG. 1 transmits video data to the video display device 130 via the HDMI (registered trademark) cable 150.

The video reproducing device 100 has a function of reproducing (decoding) video data stored in an optical disk or a storage module. The video reproducing device 100 transfers the video data decoded to the video display device 130 via the HDMI (registered trademark) cable 150 and hence, the video reproducing device 100 functions as a so-called source device.

The present embodiment describes an example that uses the video reproducing device 100 as a video transmission device. However, the present embodiment is not limited to the example. The video transmission device may be a personal computer (PC), a mobile terminal, a digital still camera, a navigation system capable of being mounted on an automobile or carried by a user, or the like.

The video display device 130 has a display 131 that complies with a 4K2K (3840×2160) resolution. Furthermore, the video display device 130 receives video data via the HDMI (registered trademark) cable 150 and hence, the video display device 130 functions as a so-called sink device.

The present embodiment describes an example that uses the video display device 130. However, the present embodiment is not limited to the example. The video display device 130 may be a television receiver, a monitor (display device), or the like.

The HDMI (registered trademark) cable 150 transmits data by a method called "transition minimized differential signaling (TMDS)". The HDMI (registered trademark) cable 150 has one clock channel and three channels for transmitting data.

Figure 2:
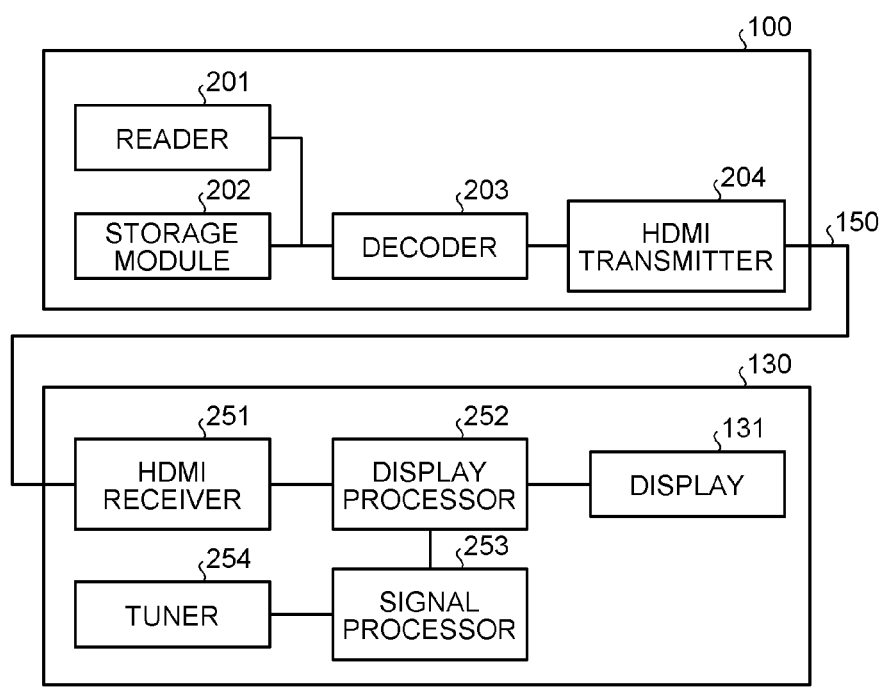
FIG. 2 is a view illustrating an example of a system configuration of a video reproducing device and a video display device in the first embodiment.

FIG. 2 is a view illustrating an example of a system configuration of the video reproducing device 100 and the video display device 130 in the present embodiment. The video reproducing device 100 illustrated in FIG. 2 comprises a reader 201, a storage module 202, a decoder 203, and an HDMI (registered trademark) transmitter 204. The reader 201 reads video data stored in an optical disk. Furthermore, the storage module 202 stores the video data therein. The video data stored is data recorded by video recording or the like.

The decoder decodes video data read by the reader 201 and video data stored in the storage module 202. The HDMI (registered trademark) transmitter 204 transmits the video data decoded in accordance with a predetermined transmission format via the HDMI (registered trademark) cable 150. Here, the HDMI (registered trademark) transmitter 204 may convert, when the video data decoded does not comply with the transmission format, the video data into data that complies with the transmission format (a 4:1:1 format in the present embodiment, for example).

The video display device 130 comprises an HDMI (registered trademark) receiver 251, a display processor 252, a display 131, a tuner 254, and a signal processor 253.

The HDMI (registered trademark) receiver 251 receives video data via the HDMI (registered trademark) cable 150.

The tuner 254 receives broadcasting signals of television broadcasts. Furthermore, the signal processor 253 demodulates the broadcasting signals received and thereafter, decodes the broadcasting signals after being demodulated to output to the display processor 252 as video data.

The display processor 252 converts digital video signals input from any one or more of the HDMI (registered trademark) receiver 251 and the signal processor 253 into video signals displayable on the display 131 and thereafter, displays the video signals on the display 131.

Figure 3:
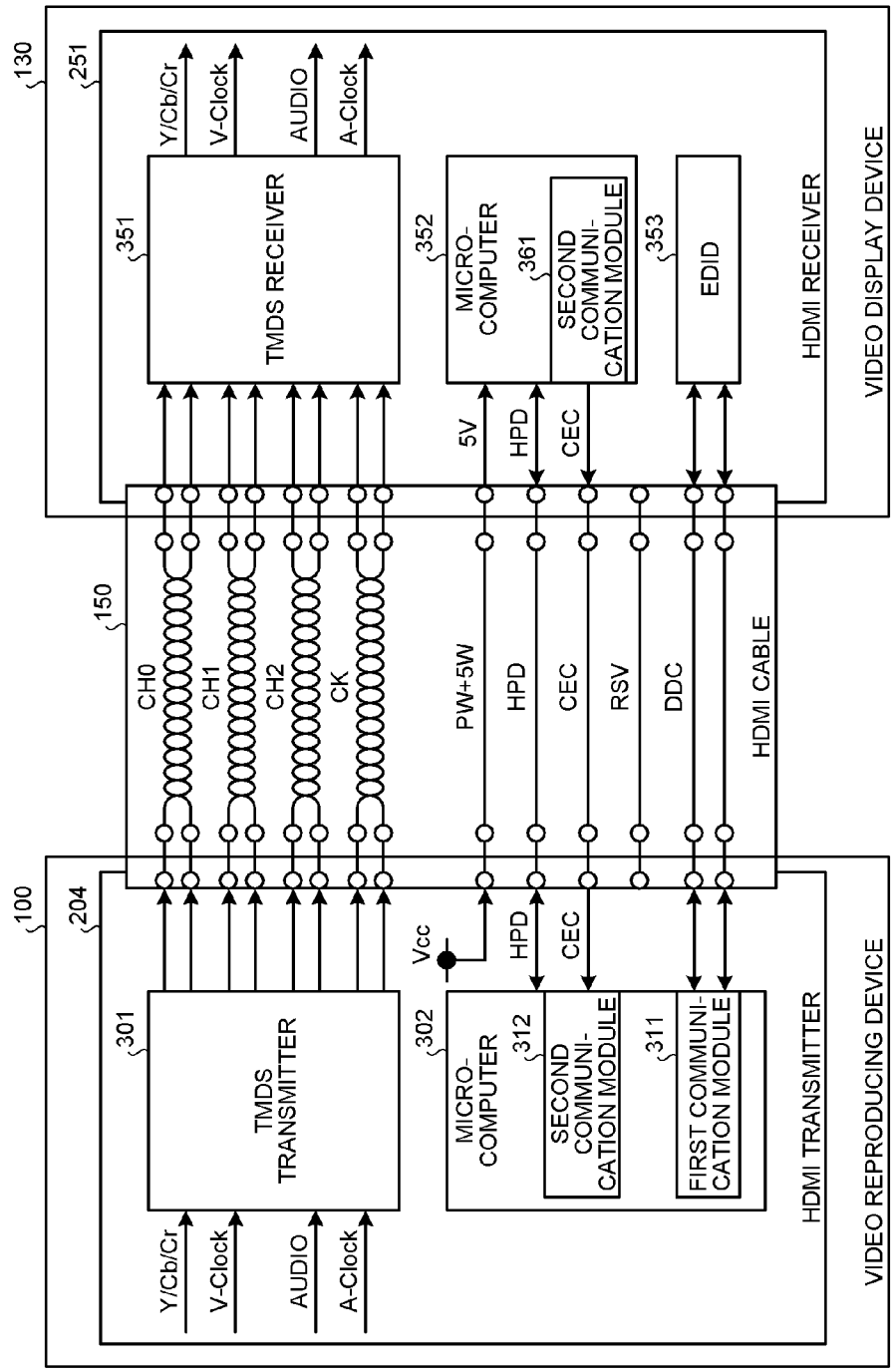
FIG. 3 is a view illustrating a configuration of an HDMI (registered trademark) transmitter of the video reproducing device, an HDMI (registered trademark) receiver of the video display device, and an HDMI (registered trademark) cable in the first embodiment.

The following describes a specific configuration with respect to transmission and reception of video data in the video reproducing device 100 and the video display device 130 according to the present embodiment. FIG. 3 is a view illustrating a configuration of the HDMI (registered trademark) transmitter 204 of the video reproducing device 100, the HDMI (registered trademark) receiver 251 of the video display device 130, and the HDMI (registered trademark) cable 150 in the first embodiment.

The HDMI (registered trademark) cable 150 illustrated in FIG. 3 is a communication cable comprising first to third channel lines CH0, CH1, and CH2, and a clock line CK each of which is configured of a twisted pair wire; a 5-volt power line (PW+5W), a hot plug detected (HPD) line, a reserve (RSV) line, a consumer electronics control (CEC) line each of which is constituted of a single wire; and a display data channel (DDC) line constituted of a paired wire.

The first to third channel lines CH0, CH1, and CH2 are used for transmitting video data. Furthermore, audio data, control data, or the like are transmitted in a horizontal retrace interval or a vertical retrace interval of the video data via the channels CH0, CH1, and CH2. Furthermore, data signals (video data, audio data, and control data) transmitted by using the channel lines CH0, CH1, and CH2 are received by the HDMI (registered trademark) receiver 251 by using a clock signal transmitted via the clock line CK as a reference signal.

The HPD line is compliant with the existing HDMI (registered trademark) specification and used for detecting a device connected therewith. Furthermore, the RSV line is prepared in accordance with the specification with which the HDMI (registered trademark) cable 150 is compliant and provided for extension in consideration of a case that the HDMI (registered trademark) cable 150 is used as a two-way communication passage.

The CEC line is used for transmitting information for performing mutual control between a microcomputer 302 and a microcomputer 352 that are connected with each other. The DDC line is used for reading data recorded in extended display identification data (EDID) 353 of the video display device 130 that is a sink device.

In the conventional HDMI (registered trademark) specification, Y (brightness component), Cb (first color difference component), and Cr (second color difference component) have been allocated to the first to third channels CH0, CH1, and CH2, respectively.

Figure 4:
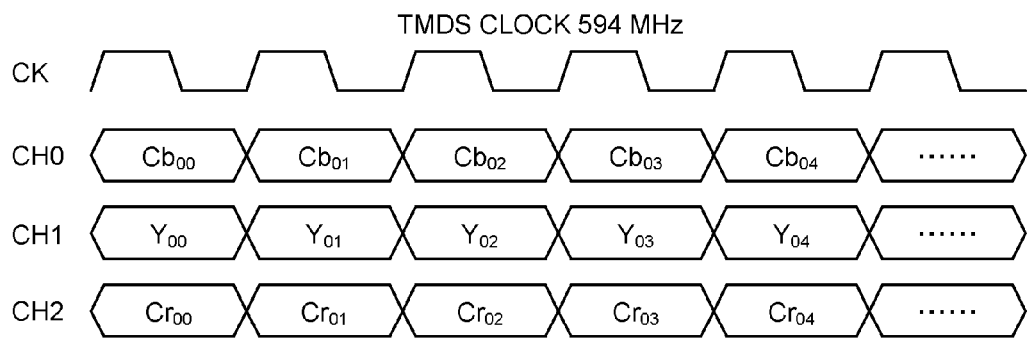
FIG. 4 is a view illustrating an example of transmitting data of one line of a video frame in video data having a 4k2k resolution based on the conventional HDMI (registered trademark) specification.

FIG. 4 is a view illustrating an example of transmitting data of one line of a video frame in video data having a 4k2k resolution based on the conventional HDMI (registered trademark) specification. In the example illustrated in FIG. 4, it is conceivable that the ratio of sampling frequencies of Y/Cb/Cr of video data be 4:4:4, 4:2:2, or the like.

As illustrated in FIG. 4, Cb (first color difference component), Y (brightness component), and Cr (second color difference component) are allocated to CH0, CH1, and CH2, respectively. Furthermore, when such video data is displayed on the video display device 130 at a rate of 60 frames per second, the product of 4400 pixels (=3840 pixels in the lateral direction of an image+a horizontal blank (HB) of 560 pixels), 2250 lines (=2160 lines in the vertical direction+a vertical blank (VB) of 90 lines), and 60 Hz equals 594 megapixels per second. That is, a pixel clock is at 594 MHz. However, in the conventional HDMI (registered trademark) specification, the maximum transmission speed is 340 MHz and hence, in the transmission method illustrated in FIG. 4, it is impossible to display video data having a 4K2K resolution at a frame rate of 60 Hz. Accordingly, in the present embodiment, there is proposed a method for transmitting video data having a 4K2K resolution at a frame rate of 60 Hz by using the HDMI (registered trademark).

In conjunction with FIG. 3 again, the system configuration of the HDMI (registered trademark) transmitter 204 of the video reproducing device 100 and the HDMI (registered trademark) receiver 251 of the video display device 130 is explained.

The HDMI (registered trademark) transmitter 204 comprises a TMDS transmitter 301 and a microcomputer 302.

The microcomputer 302 comprises a first communication module 311 and a second communication module 312. The first communication module 311 performs control for reading data recorded in the EDID 353 of the video display device 130. The second communication module 312 transmits and receives data for performing mutual control with a second communication module 361 of the HDMI (registered trademark) receiver 251 of the video display device 130.

The TMDS transmitter 301 has a signal conversion function for serial transmission of a Y/Cb/Cr (or R/G/B) video format input via the three channels of CH0, CH1, and CH2 of the HDMI (registered trademark) cable 150 in accordance with the specification. Furthermore, the TMDS transmitter 301 performs control of transmitting video data after signal conversion to the video display device 130 via the HDMI (registered trademark) cable 150. The TMDS transmitter 301 in the present embodiment inputs a V-clock signal, an AUDIO signal, and an A-clock signal thereto.

In the video data having a 4K2K resolution, 4:4:4, 4:2:2, 4:2:0, or the like is conceivable as a ratio of the sampling frequency of Y/Cb/Cr. In the present embodiment, a ratio of 4:1:1 is used. The TMDS transmitter 301 in the present embodiment also performs transmission control of video data such that Y:Cb:Cr=4:1:1.

Figure 5:
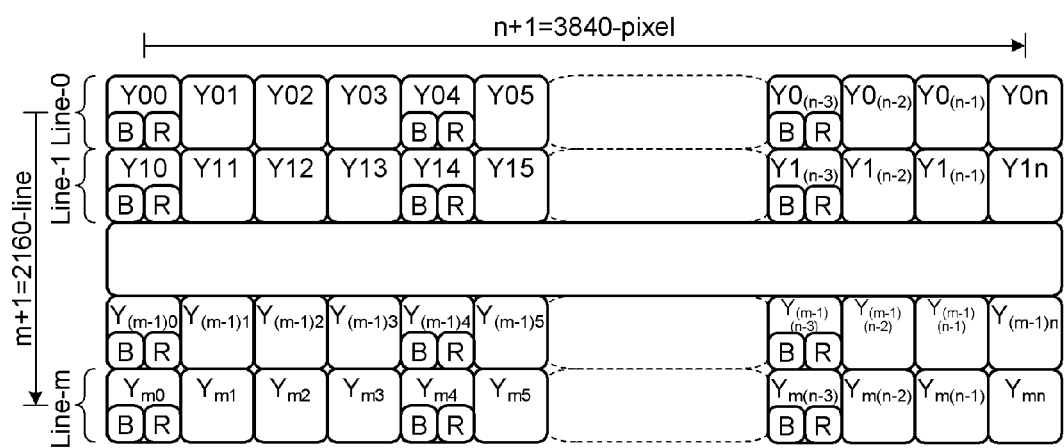
FIG. 5 is a view illustrating an arrangement example of pixels of Y:Cb:Cr=4:1:1 in video data having a 4k2k resolution in the first embodiment.

FIG. 5 is a view illustrating an arrangement example of pixels of Y:Cb:Cr=4:1:1 in video data having a 4k2k resolution in the first embodiment. As illustrated in FIG. 5, a frame of the video data is constituted of 3840 pixels (n+1=3840 pixels) in the horizontal direction and 2160 lines (m+1=2160 lines) in the vertical direction. Furthermore, a brightness component ($Y_{xx}$) is included in all pixels and color difference components (Cb, Cr) are included in every four pixels.

In the pixel array such that Y:Cb:Cr=4:1:1 illustrated in FIG. 5, the color difference signals are sampled at a ratio such that two color difference components correspond to four brightness components compared with a pixel array such that R:G:B=4:4:4 or Y:Cb:Cr=4:4:4. When comparing an amount of information, the amount of information in the case that R:G:B=4:4:4 or Y:Cb:Cr=4:4:4 is "4+4+4=12" whereas the amount of information in the case that Y:Cb:Cr=4:1:1 is "4+1+1=6".

In this manner, the amount of information can be reduced and hence, in broadcasting radio waves or storage media such as a DVD, because of the restriction of the transmission band or capacity thereof, the pixel array such that Y:Cb:Cr=4:1:1 or Y:Cb:Cr=4:2:0 is adopted as a constitution of the video frame in many cases.

Figure 6:
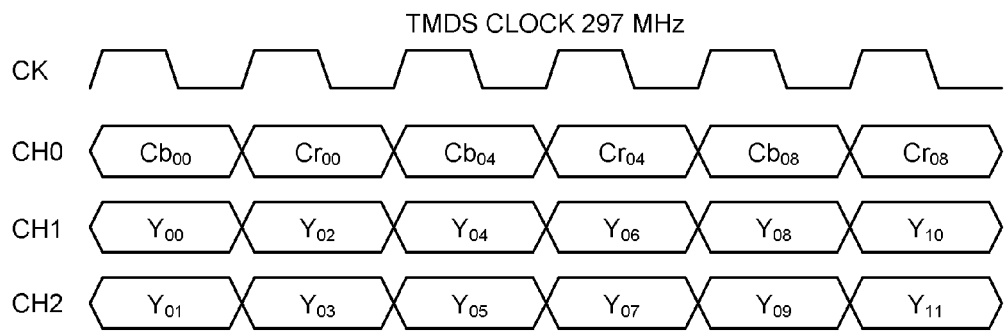
FIG. 6 is a view illustrating an example of transmitting video data having the 4k2k resolution by a TMDS transmitter in the first embodiment.

FIG. 6 is a view illustrating an example of transmitting video data having a 4k2k resolution by the TMDS transmitter 301 in the present embodiment. As illustrated in FIG. 6, when video image data of a 4:1:1 format such that a ratio of sampling frequencies among the brightness component (Y), the first color difference component (Cb), and the second color difference component (Cr) is 4:1:1 is transmitted via an HDMI (trade mark) communication interface having transmission channels of CH0, CH1, and CH2, the first color difference component (Cb) and the second color difference component (Cr) of one pixel are allocated to two respective clock cycles of CH0 and the brightness components (Y) for total four pixels are allocated to the two clock cycles of transmission channels of CH1 and CH2 to transmit the video image data to the video display device 130.

To be more specific, the TMDS transmitter 301 transmits the video data while allocating the first color difference component ($Cb_{00}$, for example) and the second color difference component ($Cr_{00}$, for example) of one pixel included in a first horizontal line of a first frame to two respective clock cycles of CH0. Further, the TMDS transmitter 301 transmits the video data while allocating, from among brightness components ($Y_{00}, Y_{01}, Y_{02}, Y_{03}$, for example) of four pixels included in the first horizontal line, brightness components ($Y_{00}, Y_{02}$) of two pixels to two respective clock cycles of CH1. Still further, the TMDS transmitter 301 transmits the video data while allocating the other brightness components ($Y_{01}, Y_{03}$) of two pixels to two respective clocks of CH2. That is to say, in the present embodiment, data of four pixels having Y:Cb:Cr=4:1:1 format can be transmitted within two clock cycles over CH0, CH1, and CH2.

Furthermore, when video data is displayed on the video display device 130 at a display speed of 60 frames per second, a transmission clock cycle (TMDS Clock) is at 297 MHz. In this manner, the transmission clock is at the frequency half that of the example (594 MHz) illustrated in FIG. 4. In the conventional HDMI (registered trademark) specification, the maximum transmission clock cycle is at 340 MHz and hence, even when hardware that complies with the conventional HDMI (registered trademark) specification is used, a display speed of 60 frames per second can be achieved when displaying the video data having a 4K2K resolution.

Figure 7:
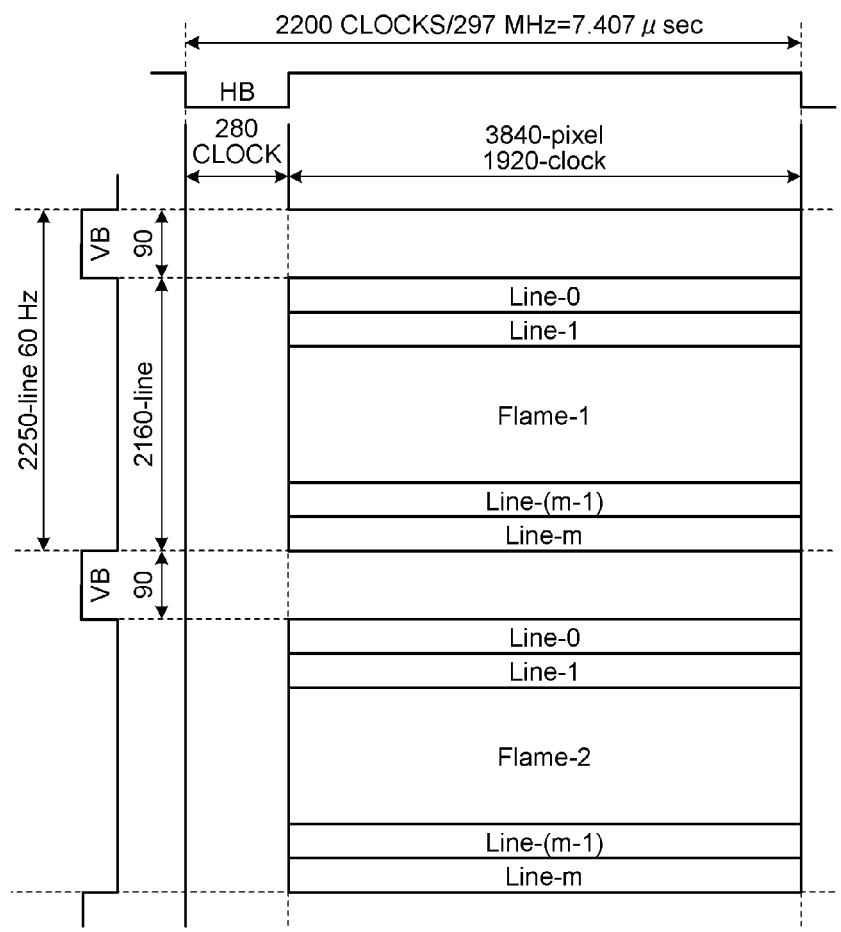
FIG. 7 is a view illustrating an example of a timing format of a unit of frame in the first embodiment.

FIG. 7 is a view illustrating an example of a timing format of each frame in the first embodiment. In the example illustrated in FIG. 7, a format of 4K2K@60 Hz (4:4:4) is changed to a format of 4K2K@60 Hz (4:1:1) and hence, the transmission clock is half the frequency. Because the number of pixels in brightness signals transmitted in the horizontal direction does not change and the number of vertical lines does not also change, as a result, the number of pixels in brightness signals transmitted in units of frame does not also change. That is, it can be confirmed that the resolution of video data does not change.

Here, when the video data illustrated in FIG. 6 are transmitted, it is also necessary for the video display device 130 that is a transmission destination to comply with the above-mentioned transmission method. Accordingly, the TMDS transmitter 301 of the video reproducing device 100 in the present embodiment confirms that the transmission destination (the video display device 130, for example) complies with the transmission method and thereafter, transmits the video data of a format of 4K2K@60 Hz (4:1:1) to the transmission destination (the video display device 130, for example).

In the present embodiment, the first communication module 311 of the video reproducing device 100 receives data from the EDID 353 of the transmission destination (the video display device 130, for example), the EDID 353 indicating a specification with which the transmission destination complies, and the microcomputer 302 determines whether the transmission destination complies with the format of 4K2K@60 Hz (4:1:1). Furthermore, when the microcomputer 302 determines that the transmission destination complies with the format of 4K2K@60 Hz (4:1:1), the TMDS transmitter 301 transmits the video data of the format of 4K2K@60 Hz (4:1:1).

In conjunction with FIG. 3 again, the video display device 130 that is a transmission destination is explained. The HDMI (registered trademark) receiver 251 of the video display device 130 comprises a TMDS receiver 351, a microcomputer 352, and the EDID 353.

The TMDS receiver 351 performs control of receiving video data from the video reproducing device 100 via the HDMI (registered trademark) cable 150 for performing serial transmission through the three channels of CH0, CH1, and CH2. The TMDS receiver 351 performs signal conversion with respect to the video data received as required and thereafter, outputs the video data (Y/Cb/Cr) to the display processor 252. In addition, the TMDS receiver 351 in the present embodiment further outputs the V-Clock signal, the AUDIO signal, and the A-Clock signal.

To be more specific, the TMDS receiver 351 in the present embodiment receives, in receiving the video data of a format of 4K2K@60 Hz (4:1:1) via the HDMI (registered trademark) cable 150, video data in which the first color difference component (Cb) and the second color difference component (Cr) are allocated to two respective clock cycles over CH0 and the brightness components (Y) for total four pixels are allocated to the two clock cycles over CH1 ad CH2.

The microcomputer 352 comprises a second communication module 361. The second communication module 361 transmits and receives information for performing mutual communication with the second communication module 312 of the HDMI (registered trademark) transmitter 204 of the video reproducing device 100.

The EDID 353 holds information indicating a display characteristics capacity of the video display device 130. FIG. 8 is a view illustrating an example of a data structure of the EDID 353 in the first embodiment. In the data structure illustrated in FIG. 8, "YCbCr (4:1:1) indicator" is stored in a data area 801 and hence, it can be confirmed that the video display device 130 complies with a format of YCbCr (4:1:1). That is, the video display device 130 can receive video data transmitted by the above-mentioned transmission method from the video reproducing device 100.

Figure 9:
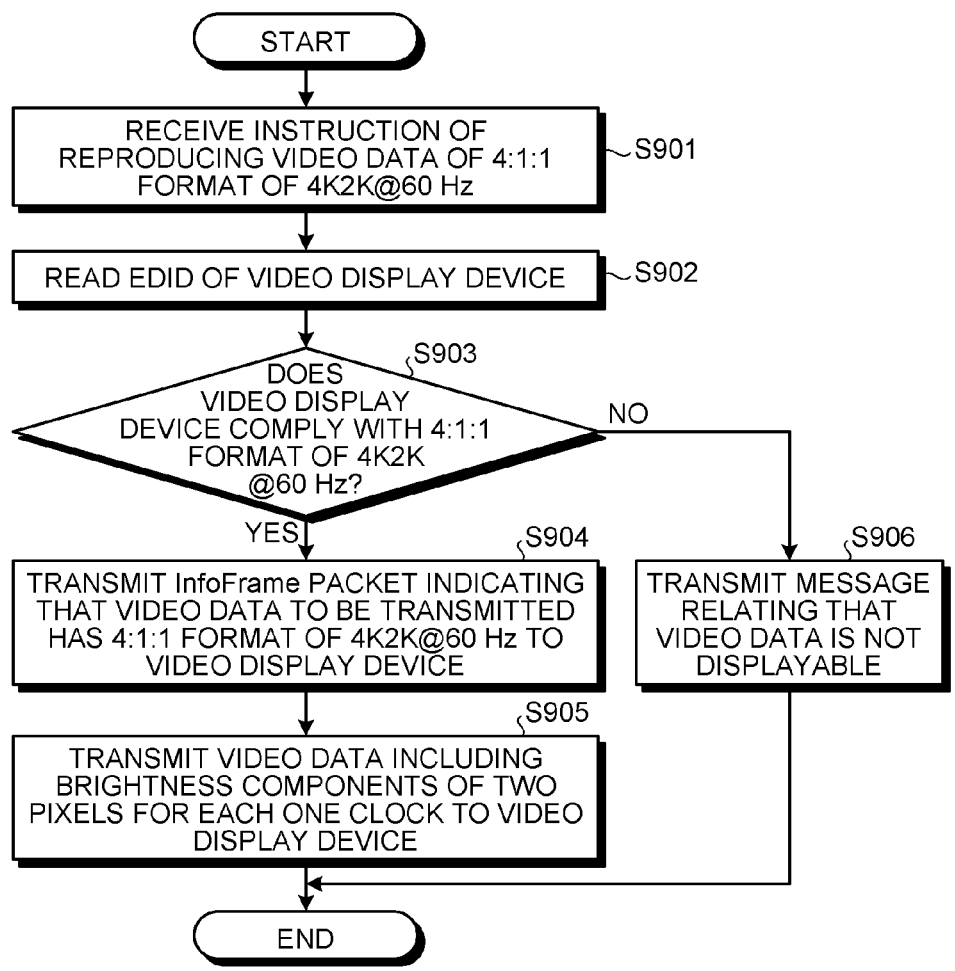
FIG. 9 is a flowchart of transmission processing of video data in the video reproducing device in the first embodiment.

The following describes transmission processing of video data in the video reproducing device 100 according to the present embodiment. FIG. 9 is a flowchart illustrating of the above-mentioned processing in the video reproducing device 100 in the first embodiment.

First of all, the video reproducing device 100 receives an instruction of reproducing video data of a 4:1:1 format of 4K2K@60 Hz from a user (S901).

Next, the first communication module 311 of the microcomputer 302 in the video reproducing device 100 reads the EDID 353 in a transmission destination (the video display device 130, for example) (S902).

The microcomputer 302 determines whether the transmission destination (the video display device 130, for example) complies with the 4:1:1 format of 4K2K@60 Hz (whether there exists a description of the 4:1:1 format) (S903). When the microcomputer 302 determines that the transmission destination does not comply with the 4:1:1 format (No at S903), the microcomputer 302 transmits a message relating the fact that the video data is not displayable (S906), and the processing is finished. The message is displayed on the video display device 130 or the like and hence, a user can recognize that the video data is not displayable.

On the other hand, when the microcomputer 302 determines that the transmission destination (the video display device 130, for example) complies with the 4:1:1 format of 4K2K@60 Hz (Yes at S903), the HDMI (registered trademark) transmitter 204 transmits an InfoFrame packet indicating that the video data to be transmitted has the 4:1:1 format of 4K2K@60 Hz to the HDMI (registered trademark) receiver 251 of the video display device 130 (S904).

FIG. 10 is a view illustrating an example of a data structure of the InfoFrame packet to be transmitted. As illustrated in FIG. 10, a data area 1001 of the InfoFrame packet stores "YCbCr (4:1:1) indicator" therein. The "YCbCr (4:1:1) indicator" is a descriptor that specifies (a pixel arrangement of) a format such that Y:Cb:Cr=4:1:1 and hence, the transmission destination (the video display device 130, for example) can recognize that the video data to be transmitted has a format such that Y:Cb:Cr=4:1:1.

Thereafter, the TMDS transmitter 301 transmits video data including brightness components of two pixels for each one clock cycle to the TMDS receiver 351 of the video display device 130 via the HDMI (registered trademark) cable 150 by using the above-mentioned transmission method (S905).

The above-mentioned processing procedures allow transmission and reception of video data having the 4:1:1 format of 4K2K@60 Hz between the video reproducing device 100 and the video display device 130.

Figure 11:
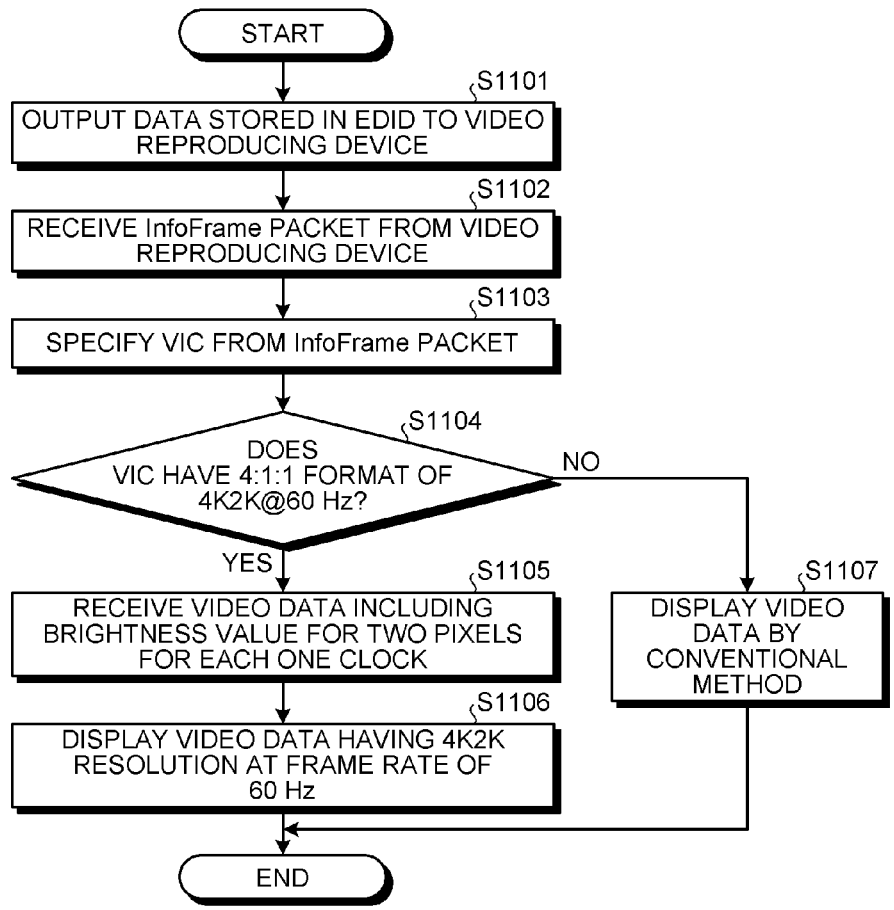
FIG. 11 is a flowchart of reception processing of video data in the video display device in the first embodiment.

The following describes reception processing of video data in the video display device 130 according to the present embodiment. FIG. 11 is a flowchart illustrating procedures of the above-mentioned processing in the video display device 130 in the first embodiment.

First of all, the video display device 130 follows a request from the video reproducing device 100 to outputs data stored in the EDID 353 to the first communication module 311 of the video reproducing device 100 (S1101).

Next, the HDMI (registered trademark) receiver 251 receives an InfoFrame packet from the HDMI (registered trademark) transmitter 204 of the video reproducing device 100 (S1102).

Furthermore, the microcomputer 352 of the HDMI (registered trademark) receiver 251 specifies a video identification code (VIC) of video data transmitted from the InfoFrame packet (S1103).

The microcomputer 352 determines whether the VIC has the 4:1:1 format of 4K2K@60 Hz (S1104). When the microcomputer 352 determines that the VIC has no 4:1:1 format of 4K2K@60 Hz (No at S1104), the video display device 130 displays the video data by a conventional method (S1107).

On the other hand, when the microcomputer 352 determines that the VIC has the 4:1:1 format of 4K2K@60 Hz (Yes at S1104), the TMDS receiver 351 receives video data including brightness components of two pixels for each one clock cycle from the TMDS transmitter 301 via the HDMI (registered trademark) cable 150 by the above-mentioned transmission method (S1105). The HDMI (registered trademark) receiver 251 outputs the video data received to the display processor 252 for every one line at a clock speed twice compared with the conventional clock speed to convert the video data into the original format.

The display processor 252 displays the video data having a 4K2K resolution that is received on the display 131 at a frame rate of 60 Hz (S1106).

The above-mentioned processing allows the video display device 130 to display the video data received from the video reproducing device 100 at a frame rate of 60 Hz.

The first embodiment describes a case in which the video dada having the 4K2K resolution at a frame rate of 60 Hz is transmitted. However, the present embodiment is not limited to this case and, for example, the present embodiment may be applied to the other video data such as video data having a resolution of 1920×1080 at a frame rate of 60 Hz.

First Modification

The first embodiment describes an example of transmitting brightness components, first color difference components, and second color difference components of all pixels included in one line of one frame and thereafter, transmitting brightness components, first color difference components, and second color difference components included in the next one line. However, the first embodiment is not limited to such a transmission method.

Figure 12:
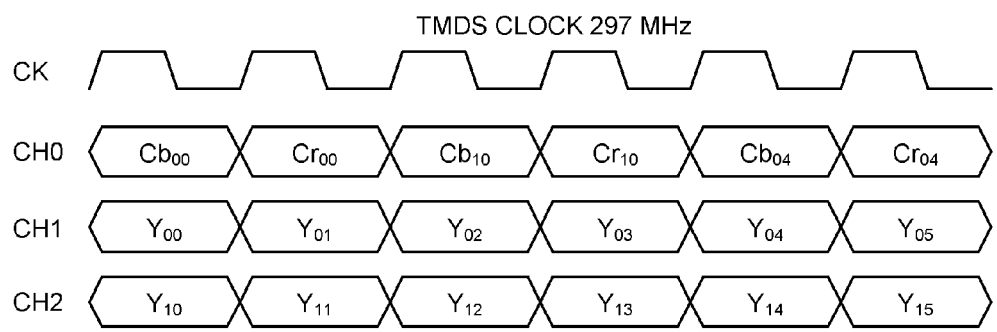
FIG. 12 is a view illustrating an example of transmitting video data having a 4k2k resolution by the TMDS transmitter according to a first modification.

FIG. 12 is a view illustrating an example of transmitting video data having a 4k2k resolution by the TMDS transmitter 301 according to a first modification. In the example illustrated in FIG. 12, in transmitting video data having a 4:1:1 format such that a ratio of sampling frequencies among a brightness component (Y), a first color difference component (Cb), and a second color difference component (Cr) is 4:1:1 via an HDMI (registered trademark) communication interface having transmission channels of CH0, CH1, and CH2, a transmission method different from the case of the first embodiment is used.

The TMDS transmitter 301 in the present modification transmits the video data by allocating a first color difference component ($Cb_{00}$) and a second color difference component ($Cr_{00}$) of one pixel included in a first horizontal line (Line-0, for example) of a first frame of video data to two respective clock cycles of CH0. Further, the TMDS transmitter 301 transmits the video data by allocating a first color difference component ($Cb_{10}$) and a second color difference component ($Cr_{10}$) of one pixel included in a second horizontal line different from the first horizontal line of the first frame to the next two respective clock cycles of CH0. Furthermore, the TMDS transmitter 301 transmits the video data by allocating brightness components ($Y_{00}$, $Y_{01}$, $Y_{02}$, $Y_{03}$) of four pixels included in the first horizontal line (Line-0, for example) to four respective clocks of CH1. Still further, the TMDS transmitter 301 transmits the video data by allocating brightness components ($Y_{10}$, $Y_{11}$, $Y_{12}$, $Y_{13}$) of four pixels included in a second horizontal line (Line-1, for example) to four respective clock cycles of CH2.

In this manner, brightness components of even numbers of lines are allocated to CH1, brightness components of odd numbers of lines are allocated to CH2, and color difference components of the even numbers of lines and the odd numbers of lines are allocated to CH0 to transmit video data thus achieving a transmission clock (TMDS clock) at a frequency of 297 MHz in the same manner as the case of the first embodiment.

Figure 13:
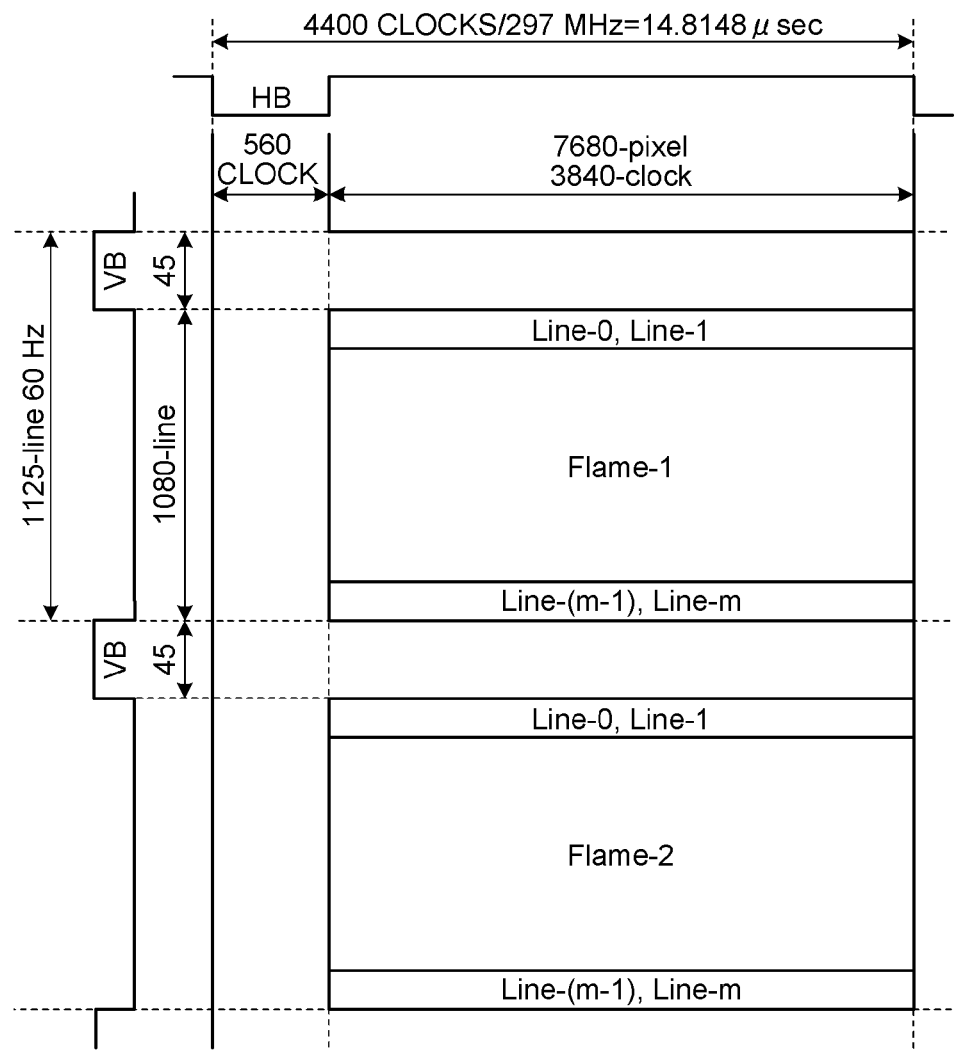
FIG. 13 is a view illustrating an example of a timing format of a unit of frame in the modification 1.

FIG. 13 is a view illustrating an example of a timing format of each frame in the present modification. In the example illustrated in FIG. 13, a brightness component of one pixel included in a horizontal line is transmitted for each one clock and hence, for transmitting the brightness components in the horizontal line, it takes time twice compared with the case of the first embodiment. On the other hand, for transmitting brightness components in a vertical line, the brightness components of two lines are transmitted for each one clock and hence, the number of vertical lines is half that of the first embodiment. Accordingly, in the transmission method in the modification 1, a clock is at the frequency half that of the case of 4K2K@60 Hz (4:4:4) in the same manner as the case of the first embodiment.

It is also necessary for the video display device 130 to comply with the transmission method. For indicating that the video display device 130 complies with such a timing format, the EDID 353 of the video display device 130 also holds information of a fact that the video display device 130 complies with the timing format. As a manner of holding data, in the same manner as the case of the first embodiment, "YCbCr (4:1:1) indicator" may be described in a dada area, and a description different from the case of the first embodiment may be held. Furthermore, a plurality of timing formats of "YCbCr (4:1:1)" may exist. In this case, in the EDID 353, descriptions different from each other for timing formats are held.

Second Modification

The above-mentioned embodiment and modification describes an example of transmitting and receiving video data having a 2D format of a 4K2K resolution. However, video data to be transmitted and received is not limited to data having a 2D video format, and video data having a 3D video format may be transmitted.

Figure 14:
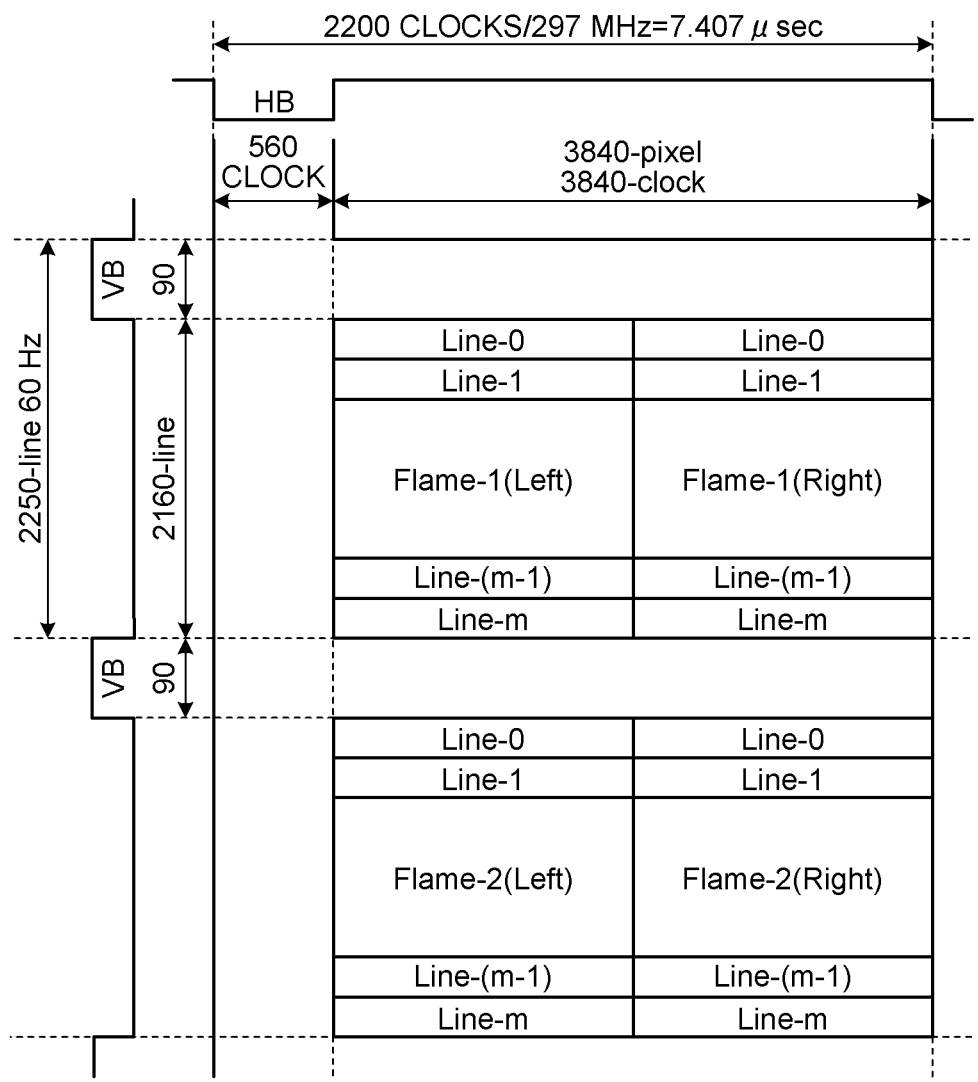
FIG. 14 is a view illustrating an example of a timing format of a unit of frame in a 3D video format of 4K2K@ 60 Hz (4:1:1) according to a second modification.

FIG. 14 is a view illustrating an example of a timing format of each frame in a 3D video format of 4K2K@60 Hz (4:1:1) according to a second modification. In the example illustrated in FIG. 14, as a 3D video format, a side-by-side format is used, a resolution of a left half part of a horizontal resolution is used as a frame-image resolution for a left eye, and a resolution of a right half part of the horizontal resolution is used as a frame-image resolution for a right eye. Here, the present modification is not limited to the side-by-side format and, for example, "Line Alternate" format may be used.

The TMDS transmitter 301 allocates, in the same manner as the case of the first embodiment, brightness components, first color difference components, and second color difference components to the respective channels.

That is, with respect to video data of a 3D video format, the TMDS transmitter 301 in the present modification transmits the video data by allocating a first color difference component (Cb) and a second color difference component (Cr) of one pixel included in a first horizontal line (Line-0) of a first frame for a left eye to two respective clocks of CH0. Further, the TMDS transmitter 301 transmits the video data by allocating brightness components (Y) of four pixels included in the first horizontal line of the first frame for the left eye to the two clocks of CH1 and CH2.

The TMDS transmitter 301 transmits all of the first color difference components, the second color difference components, and the brightness components of the first horizontal line of the first frame for the left eye. Then, the TMDS transmitter 301 transmits video data by allocating a first color difference component (Cb) and a second color difference component (Cr) of one pixel included in a first horizontal line (Line-0) of a first frame of a right eye to two respective clock cycles of CH0, and by allocating brightness components of four pixels included in the first horizontal line of the first frame for the right eye to the two clock cycles of CH1 and CH2.

In the present modification, the resolution of each horizontal line of the frame for the left eye and the frame of the right eye of the 3D video format is one-half of the resolution of the video data having the 2D video format and hence, a time required for transmitting one horizontal line of the sum of the frame for the left eye and the frame of the right eye is same as that required for transmitting one horizontal line of one frame in the first embodiment. That is, even in the case of the 3D video format, video data can be transmitted having a 4K2K resolution at a frame rate of 60 Hz.

Third Modification

The second modification describes an example of transmitting, in the video data having a 3D video format, one line for the left eye and thereafter transmitting one line for the right eye. However, the second modification is not limited to such the manner of transmission. The following describes a third modification that is an example of transmitting a frame for a left eye and thereafter transmitting a frame for a right eye.

Figure 15:
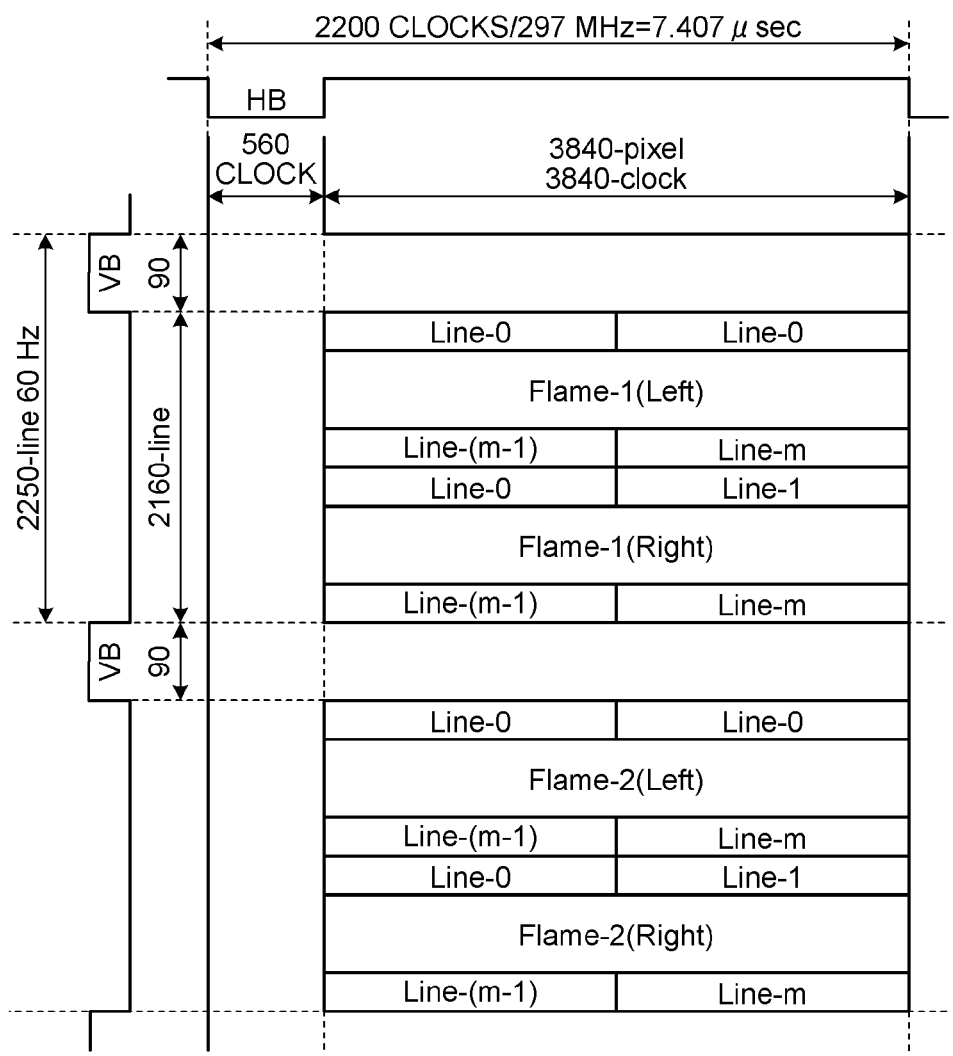
FIG. 15 is a view illustrating an example of a timing format of a unit of frame in a 3D video format of a 4K2K@60 Hz (4:1:1) according to a third modification.

FIG. 15 is a view illustrating an example of a timing format of each frame in a 3D video format of 4K2K@60 Hz (4:1:1) according to the third modification. In the example illustrated in FIG. 15, as a 3D video format, a side-by-side format is used, a resolution of a left half part of a horizontal resolution is used as a frame-image resolution for a left eye, and a resolution of a right half part of the horizontal resolution is used as a frame-image resolution for a right eye.

In the example illustrated in FIG. 15, all lines (Line-0 to Line-m) of a first frame for the left eye are transmitted and thereafter, all lines (Line-0 to Line-m) of a first frame of the right eye are transmitted.

That is to say, for video data having the 3D video format, the TMDS transmitter 301 in the present modification allocates a first color difference component (Cb) and a second color difference component (Cr) of one pixel included in each horizontal line (each of Line-0 to Line-m) of the first frame for the left eye to two respective clock cycles of CH0, and allocates brightness components (Y) of four pixels included in each horizontal line (each of Line-0 to Line-m) to the two clock cycles of CH1 and CH2. Then, the TMDS transmitter 301 transmits the first color difference components (Cb), the second color difference components (Cr), and the brightness components (Y) included in all lines of the first frame for the left eye.

Thereafter, the TMDS transmitter 301 transmits the video data by allocating the first color difference component (Cb) and the second color difference component (Cr) of one pixel included in each horizontal line (each of Line-0 to Line-m) of a first frame for the right eye to two respective clock cycles of CH0 and by allocating brightness components (Y) of four pixels included in each horizontal line (each of Line-0 to Line-m) of the first frame for the right eye to the two clock cycles of CH1 and CH2.

In the example illustrated in FIG. 15, compared with the video timing format illustrated in FIG. 14, the transmission clock frequency does not change. However, a video signal for the left eye is arranged in the upper half part of the video timing format and a video signal for the right eye is arranged in the lower half part of the video timing format. Upon receipt of such video data, the video display device 130 displays the video data in a stereoscopically visible manner under the control of the arrangement or the like of each data (brightness components, first color difference components, second color difference components).

In the above-mentioned embodiments and modifications, the video reproducing device 100 and the video display device 130 are provided with the above-mentioned constitutions and the video data having a 4K2K resolution is transmitted in a 4:1:1 format by the above-mentioned transmission method thus being able to transmit and receive the video data having the 4K2K resolution at a frame rate of 60 Hz by using an existing physical HDMI (registered trademark) technique (HDMI (registered trademark) 1.4b).

In addition, even in the case of a video timing format (4:4:4, for example) incapable of being transmitted by using the HDMI (registered trademark), the video timing format of video data is converted into the 4:1:1 format to transmit the video data and hence, the transmission clock frequency may be reduced to half compared with the case of the 4:4:4 format thus being able to transmit the video data at a frame rate of 60 Hz. Due to such a constitution, it is unnecessary to increase a transmission speed compared with the conventional transmission speed thus enabling design of a large-scale integration (LSI) for HDMI (registered trademark) communication with low cost and low power consumption.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video transmission device comprising:
a transmitter configured to transmit, via a communication interface comprising a first transmission channel, a second transmission channel, and a third transmission channel, video data having a 4:1:1 format to a video display device configured to display the video data, wherein 4:1:1 represents a ratio of a sampling frequency of a brightness component, to a sampling frequency of a first color difference component, to a sampling frequency of a second color difference component, the first color difference component and the second color difference component of one pixel in a first horizontal line of a first frame of the video data are allocated and transmitted within two clock cycles of the first transmission channel, brightness components of four pixels in the first horizontal line are allocated and transmitted within two clock cycles of the second transmission channel and the third transmission channel, and the transmitter is configured to
transmit the video data to the video display device for all of the pixels of the first horizontal line of the first frame of the video data, and
after transmitting the video data for all of the pixels of the first horizontal line, set pixels in a second horizontal line next to the first horizontal line of the first frame of the video data as a target to be transmitted.

2. The video transmission device of claim 1, wherein,
for stereoscopically visible video data, the transmitter is configured to allocate and transmit a first color difference component and a second color difference component of one pixel in a first horizontal line of a first frame for a first eye within two clock cycles of the first transmission channel, and to transmit brightness components of four pixels in the first horizontal line within two clock cycles of the second transmission channel and the third transmission channel, and,
after transmitting first color difference components, second color difference components, and brightness components of the first horizontal line, the transmitter is configured to allocate and transmit a first color difference component and a second color difference component of one pixel in a first horizontal line of a first frame for a second eye within two clock cycles of the first transmission channel, and to allocate and transmit brightness components of four pixels in the first horizontal line within two clock cycles of the second transmission channel and the third transmission channel.

3. The video transmission device of claim 1, wherein,
for stereoscopically visible video data, the transmitter is configured to allocate and transmit a first color difference component and a second color difference component of one pixel in each horizontal line of a first frame for a first eye within two clock cycles of the first transmission channel, and to allocate and transmit brightness components of four pixels in each horizontal line of the first frame within two clock cycles of the second transmission channel and the third transmission channel, and,
after transmitting first color difference components, second color difference components, and brightness components in all lines of the first frame for the first eye, the transmitter is configured to allocate and transmit a first color difference component and a second color difference component of one pixel in each horizontal line of a first frame for a second eye within two clock cycles of the first transmission channel, and to allocate and transmit brightness components of four pixels in each horizontal line of the first frame for the second eye within two clock cycles of the second transmission channel and the third transmission channel.

4. The video transmission device of claim 1, further comprising:
   a receiver configured to receive information from the video display device, the information indicating a specification with which the video display device complies, wherein
   the transmitter is configured to transmit the video data when the video display device is capable of displaying video data having the 4:1:1 format.

5. A video display device comprising:
   a receiver configured to receive, via a communication interface comprising a first transmission channel, a second transmission channel, and a third transmission channel, video data having a 4:1:1 format; and
   a display configured to display the received video data in accordance with the 4:1:1 format, wherein
      4:1:1 represents a ratio of a sampling frequency of a brightness component, to a sampling frequency of a first color difference component, to a sampling frequency of a second color difference component,
      the first color difference component and the second color difference component of one pixel in a first horizontal line of a first frame of the video data are allocated and received within two clock cycles of the first transmission channel,
      brightness components of four pixels in the first horizontal line are allocated and received within two clock cycles of the second transmission channel and the third transmission channel, and
      the receiver is configured to receive, after transmission of video data of all of the pixels of the first horizontal line of the first frame of the video data, video data of a second horizontal line next to the first horizontal line of the first frame.

6. A video transmission method performed by a video transmission device, the method comprising:
   transmitting, via a communication interface comprising a first transmission channel, a second transmission channel, and a third transmission channel, video data having a 4:1:1 format to a video display device configured to display the video data, wherein
      4:1:1 represents a ratio of a sampling frequency of a brightness component, to a sampling frequency of a first color difference component, to a sampling frequency of a second color difference component,
      the first color difference component and the second color difference component of one pixel in a first horizontal line of a first frame of the video data are allocated and transmitted within two clock cycles of the first transmission channel,
      brightness components of four pixels in the first horizontal line are transmitted within two clock cycles of the second transmission channel and the third transmission channel, and
      the transmitting comprises transmitting the video data to the video display device for all of the pixels of the first horizontal line of the first frame of the video data, and, after transmitting the video data for the all of the pixels of the first horizontal line, setting pixels in a second horizontal line next to the first horizontal line of the first frame of the video data as a target to be transmitted.

* * * * *